Jan. 22, 1935.  E. A. STALKER  1,988,670

WING CONSTRUCTION

Original Filed Dec. 13, 1929

Inventor
Edward A. Stalker

Patented Jan. 22, 1935

1,988,670

UNITED STATES PATENT OFFICE 1,988,670

WING CONSTRUCTION

Edward A. Stalker, Ann Arbor, Mich.

Application December 13, 1929, Serial No. 413,752
Renewed June 11, 1934

16 Claims. (Cl. 244—12)

My invention relates to improvements in airplane wings in which a suction device is used to remove some of the air from the surface of the wing; and the objects of my invention are first, to provide an electrically driven or other type of suction pump consuming the minimum power for drawing the air into the wing; secondly, to provide a means of preventing water from entering the wing.

It is known in the science of aeronautics that if a small quantity of air is drawn into the wing from the upper surface of the wing, the wing can attain high lifting power at large angles of attack.

It is desirable to obtain this lifting capacity with the minimum weight of the pumping installation. This object will be best obtained if the pressure difference between the inlet and outlet of the pump is small.

The pump should therefore discharge by means of an expanding conical tube into a low pressure region, but this region should be such that the efficiency of the airplane is not greatly impaired. The region near the wing tip is the most desirable. The battery and motor weight required are thus appreciably lowered by this arrangement.

Furthermore the required power is less for a given lift if the wing section has a high arching of the mean camber line.

Figure 1:
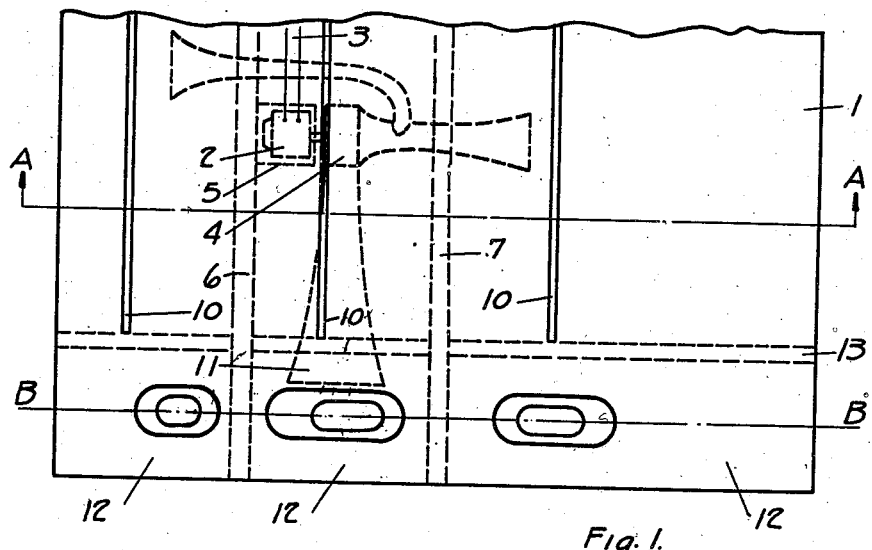
Figure 2:
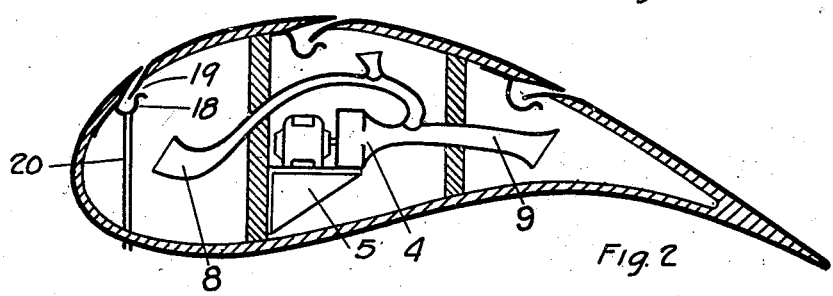
Figure 3:
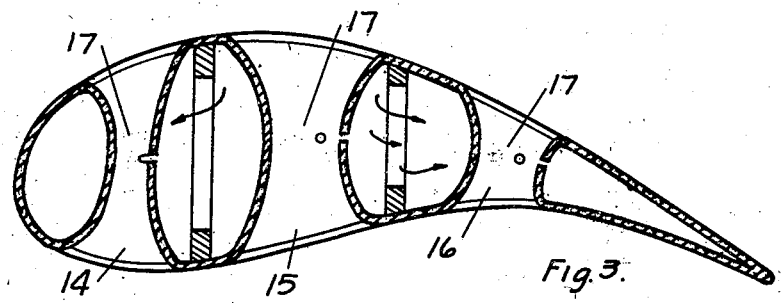
Figure 4:
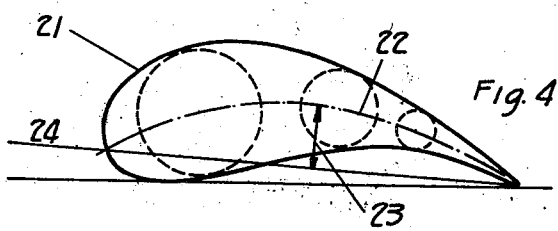

I attain the above objects by the devices illustrated in the accompanying drawing, in which Figure 1 represents a plan view of an airplane wing. Figure 2 is a vertical section through the wing at A—A and Figure 3 is a vertical section through the wing at B—B. Figure 4 defines the wing section.

In Figure 1 a wing 1 encloses the electric motor 2 driven by current flowing in the wires 3. The motor and the fan 4 are supported by the platform 5. The wing beams are indicated by 6 and 7. The fan 4 draws air from the compartments formed by the wing beams by means of the ducts 8 and 9 and so draws air from the wing surface through the openings 10. The fan discharges the air through the expanding duct 11 so that the velocity of discharge is a minimum. The air is discharged into the compartment 12 which is sealed off from the remainder of the wing by the partition 13. Air is withdrawn from the compartment 12 by means of venturis 14, 15, and 16 shown in Figure 3. Holes 17 at the venturi throats are the openings through which air is withdrawn from the compartment 12. By discharging the air into the passage at the inner surface the flow is carried upward adjacent to the surface with higher energy content next to the surface than it would otherwise have because of the friction along the wall. This aids and increases the flow through the passage.

It is further obvious that in the event the motor fails, air is still removed from the surface of the wing through the agency of the suction above the wing due to the difference in pressure existing between the wing tip (or the leading edge) and the aft portion of the wing; or between the throat of the venturi and the high pressure regions of the wing. Thus the passage 8, 9 provides such a communication. Likewise, the passage or route 9, 11, 17 provides a similar means of communication.

In Figure 2 the channel 18 extends along under the slots 10 in the wing. Any water entering through the slot is thrown to the bottom of the slot by centrifugal force when the air makes the turn necessary to pass through the opening 19. A tube 20 drains the water from the channel.

In Figure 4 the wing section is 21 and the mean camber line is 22. The maximum ordinate 23 of the mean camber line is measured from the subtending chord 24. The ordinate is best expressed as a ratio to the chord length. Where the term series of openings is used it includes a single slot-like opening which may be regarded as the limiting case of a series of openings extending along the line of the slot.

The maximum lift of the conventional wing reaches its maximum with a maximum camber ordinate less than 10%. Even wings of this camber ordinate are not used in practice because of their high resistance. By removing the air which is normally slowed up by friction with the wing surface (that is, the boundary layer), a practically ideal (non viscous) flow can be obtained. In this case a stream of fluid may be made to turn through 180°, and such a case may be realized in practice if the boundary layer is removed. Thus wings with a maximum mean camber greater than 100 per cent are possible with lifting capacity some ten times greater than normal wings. The drag or resistance may be correspondingly reduced.

It is well known that with boundary layer removal the angle of attack may be increased to large values and correspondingly high lifts may be obtained. However, in many cases it is advantageous to obtain the high lift without using a great range of angles of attack. This may be accomplished by increasing the camber instead. It is unpleasant for passengers to be rotated through an angular range in excess of about 20 degrees. With high cambers the rotation may be eliminated. Furthermore, high camber and thickness are desirable in providing housing for passengers and motors within the wing and for structural purposes.

I claim:

1. In a wing possessing openings in the surface, a means of causing a flow of air through the openings, and a means of separating water from the air before it reaches the means of causing the flow.

2. In combination with a wing possessing openings in the surface and a maximum mean camber ordinate greater than nine per cent of the chord, means of causing a flow through the openings, said means being in communication, through an expanding passage, with a Venturi-like passage.

3. In combination with a wing possessing openings in the surface, a maximum mean camber ordinate greater than eight per cent of the chord length, a thickness greater than eighteen per cent of the chord, means of causing a flow through the openings, said means being in communication, through an expanding passage, with the throat of a Venturi-like passage.

4. In combination with a wing possessing a set of openings in the wing surface, and distributed over the surface, a means independent of the relative motion of the air past the aircraft, of causing an inward flow of air through the wing openings, and of discharging the air at the upper surface of the wing, ahead of a point two-thirds of the chord back from the leading edge near the wing's lateral extremity.

5. In combination with a wing possessing a set of openings in the wing surface, and distributed over the surface, a means, actuated by energy independent of the energy of the air flow relative to the airplane, of causing an inward flow of air through the wing openings, and of discharging the air at the upper surface of the wing ahead of a point two-thirds of the chord back from the leading edge near the wing's lateral extremity.

6. In combination with a wing possessing a series of openings in the wing surface and distributed over the surface, a means, independent of the relative motion of the airplane through the air, of causing an inward flow of air through the wing openings and of discharging the air through a passage having its exit at the upper surface of the wing, ahead of a point two-thirds of the chord back from the leading edge near the wing's lateral extremity, the said means being interposed between the entrance and exit openings of the passage.

7. In combination with a wing possessing openings in the surface, and a maximum thickness greater than eighteen per cent of the chord, means of causing a flow through the openings, said means being in communication through an expanding passage with a Venturi-like passage.

8. In combination with a wing possessing a series of openings in the wing surface, a prime mover, and a pumping means with an expanding passage in communication with a venturi.

9. In combination with a wing possessing a series of openings in the wing surface, a prime mover, and a pumping means with an expanding passage in communication with a throat of a venturi.

10. In combination with a wing possessing openings in the surface, a means of causing an inward flow of air through the openings, said means being in communication, through an expanding passage, with a passage having a diverging section.

11. In combination with a wing possessing openings in its surface, a means of causing a flow of air through the openings, said means being in communication, through an expanding passage, with a passage having a diverging or converging part, one entrance being at the lower surface of the wing.

12. In combination with a wing possessing openings in the surface and a maximum mean camber ordinate lying between nine per cent. and fifty per cent. of the chord, means of causing a flow through the openings, said means being in communication through an expanding passage, with a passage between the upper and lower surfaces of the wings.

13. In combination with a wing possessing openings in the surface and a maximum means camber ordinate lying between nine per cent and fifty per cent of the chord, means of causing a flow through the openings said means being in communication through an expanding passage with another passage through the wing.

14. A wing possessing openings in its upper surface, a substantially free passage extending from the region below to the region above the wing, openings in the passage wall to cause an inward flow of air through the wing openings, and means to extract moisture from the air before it reaches the passage.

15. In a wing associated with a main relative flow and possessing openings in the upper surface for the induction of the boundary layer; a through tube providing a passage from the under side to the upper side of the wing to provide a flow therethrough of energy content substantially as large as the energy content of the main relative flow per unit of mass, a perforated passage wall to provide openings into the wing interior, a means of pumping in communication with the wing surface openings, and a conduit to provide communication between the pump and the passage wall openings for discharge of the inducted air adjacent to the interior surface of the said wall.

16. In a wing associated with a main relative flow of air and possessing a narrow spanwise slot in the upper surface for the induction of the boundary layer, a through passage from the under side to the upper side providing a flow of air therein whose energy content at the exit is substantially equal to the energy content of the main relative flow per unit of mass, a perforated passage wall to provide openings leading into the wing interior, a means of pumping in communication with the surface openings, and an expanding conduit leading from the pump and in communication with the passage wall openings to enable the means of pumping to discharge into the passage.

EDWARD A. STALKER.